United States Patent [19]

Wenrick et al.

[11] 4,081,504
[45] Mar. 28, 1978

[54] ENCAPSULATED COMPOSITE METALLIZED STRIP AND METHOD OF MAKING THE SAME

[75] Inventors: Brian A. Wenrick, Dayton; Michael G. Gross, Tipp City, both of Ohio

[73] Assignee: Protective Treatments, Inc., Dayton, Ohio

[21] Appl. No.: 685,095

[22] Filed: May 10, 1976

[51] Int. Cl.² ............................................. B29F 3/10
[52] U.S. Cl. ......................... 264/174; 156/306; 264/177 R; 264/210 R; 264/285; 264/339; 428/31; 428/67; 428/164
[58] Field of Search .......... 264/174, 171, 177 R, 264/90, 178, 285, 339, 210 R; 156/306; 428/31, 67, 164

[56] References Cited

U.S. PATENT DOCUMENTS

| 3,136,676 | 6/1964 | Fisch | 264/171 |
|---|---|---|---|
| 3,138,834 | 6/1964 | Shanok et al. | 428/31 |
| 3,440,129 | 4/1969 | Anselm | 428/31 |
| 3,681,180 | 8/1972 | Kent | 428/189 |
| 3,745,056 | 7/1973 | Jackson | 428/157 |
| 3,780,152 | 12/1973 | Friesner | 264/177 R |
| 3,811,989 | 5/1974 | Hearn | 264/177 R |
| 3,851,028 | 11/1974 | Beyer | 264/90 |
| 3,881,042 | 4/1975 | Ungerer | 428/67 |
| 3,886,250 | 5/1975 | Danko | 264/177 R |
| 3,922,460 | 11/1975 | Jackson | 428/164 |

Primary Examiner—Jeffery R. Thurlow
Attorney, Agent, or Firm—Dressler, Goldsmith, Clement, Gordon & Shore, Ltd.

[57] ABSTRACT

A laterally bent and longitudinally bendable extrusion product and method of making the same in which a composite metallized strip is encapsulated in a transparent sheath of molten thermoplastic and subsequently fed to a forming zone where it is laterally bent and cooled. The composite metallized strip includes a core of metallized particles sandwiched between and thermoplastically bonded to a transparent plastic substrate and a rigidifying support layer which is constructed and arranged to substantially prevent delamination, discolorization and deformation of the metallized particles.

8 Claims, 7 Drawing Figures

U.S. Patent   March 28, 1978   4,081,504
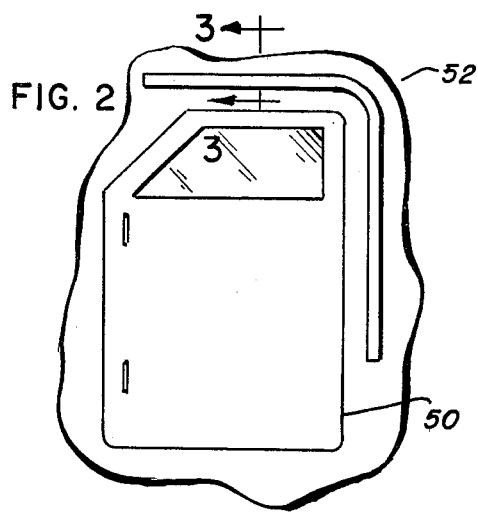
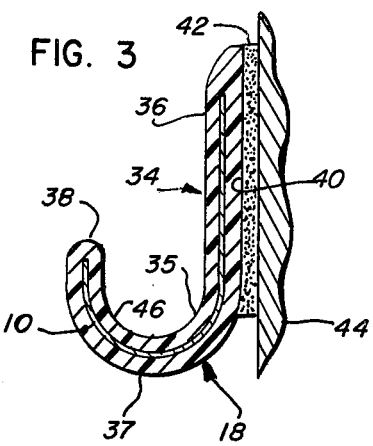
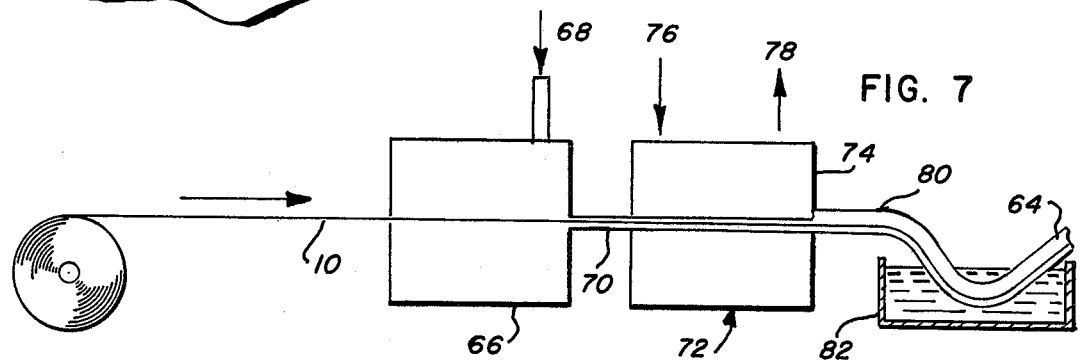
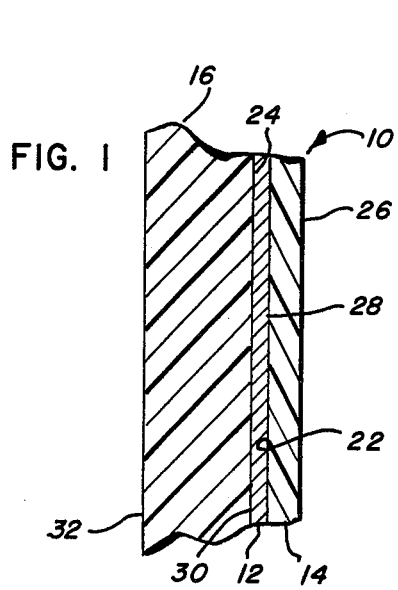
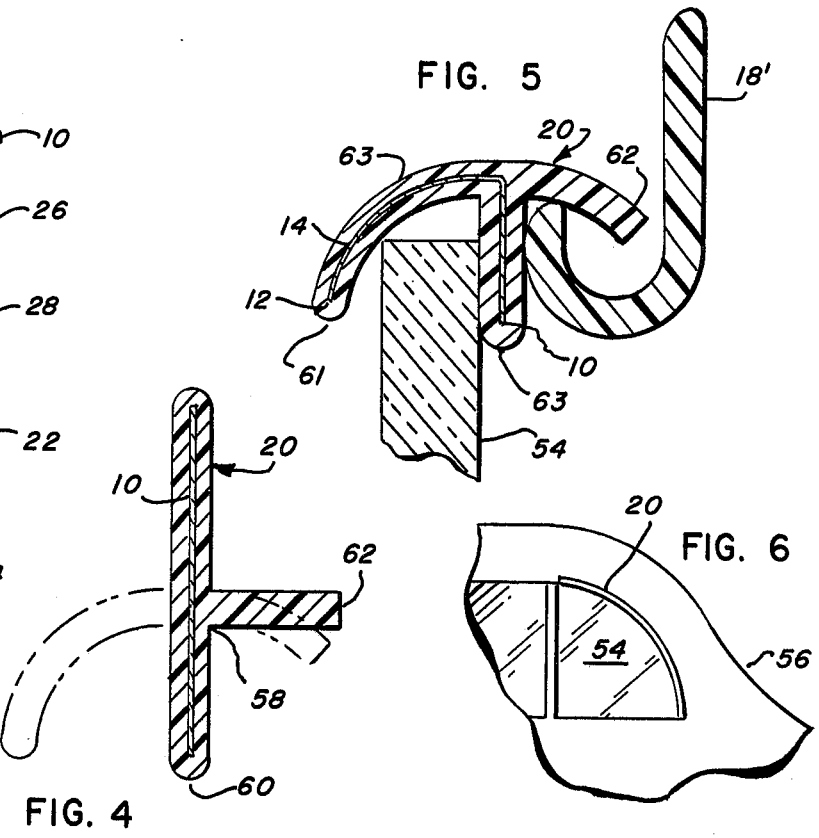

ENCAPSULATED COMPOSITE METALLIZED STRIP AND METHOD OF MAKING THE SAME

The present invention relates to decorative trim strips of nonplanar cross section which present a metallic appearance and which are longitudinally bendable without disrupting the thin metallized film which is relied upon to provide the desired metallic appearance.

Decorative trim strips having a plastic body portion bonded to a layer of transparent plastic (usually polyethylene terephthalate) having a metallic film on one surface thereof to provide a metallized appearance are known. This metallized film is sandwiched between the plastic body portion and the transparent layer to be visible through this layer. This composite of plastic body portion and metallized layer is enclosed or encapsulated within a sheath of resinous plastic which is transparent to provide the final decorative trim strip. In practice, encapsulation is achieved by extruding a sheath of molten transparent plastic about a strip or ribbon of the composite described above, and this forms a continuous strip which simulates in appearance a conventional chrome or stainless steel strip and has similar functional and decorative utility. Conventional polyvinyl chloride having a thickness of substantially less than 0.010 inch, however, has not been able to withstand extrusion pressures and temperatures, without deteriorizing, sagging and stretching resulting in delamination, buckling and bunching up of the metallic film in the extruder. Conventional polyvinyl chloride having a thickness substantially greater than 0.050 inch is too rigid to be longitudinally bendable. The prior art in this field is illustrated by U.S. Pat. Nos. 3,881,042, 3,843,475, 3,755,052, 3,745,056, 3,711,360, 3,547,516, and 3,245,864.

Strips produced in the conventional manner possess several disadvantages. Most importantly, if these strips are laterally shaped and the nonplanar strip is bent longitudinally to enable application around a door or window on an automobile, the metallized film tends to delaminate and break up which produces an unsightly appearance. Since such non-planar strips are frequently subjected to longitudinal bending in use, and since an attractive metallic appearance is an important aspect of their use, this unsightly delamination is a serious drawback.

Furthermore, when an effort is made to employ a thin strip as the vinyl plastic support layer, this strip tends to melt when contacted with the molten thermoplastic encapsulating material, and this causes the metallized film to either wrinkle, which is unsightly, or the film bunches up within the extruder and does not appear in the product which is produced. This difficulty is avoided if the supporting layer is of usual thickness (about ⅛ inch to ¼ inch), but then the final product bent to a nonplanar cross section cannot be longitudinally bent without defacing the metallized film.

We have found that by employing a plastic support layer having a thickness of from 0.010 inch to 0.050 inch, and desirably not in excess of 0.030 inch, the prior art problems of melting, sagging, wrinkling, buckling and delamination are avoided, and the resulting encapsulated metallized composite can be laterally configured before it hardens, and the product is still longitudinally bendable without appreciable disfigurement of the metallized film.

In the practice of this invention, a composite strip comprising a vinyl plastic body portion having a thickness of 0.010 to 0.050 inch with one side thereof bonded to a transparent layer of plastic (preferably polyethylene terephthalate) having a metallized film coating bonded to the vinyl plastic body, is encapsulated within a transparent plastic sheath. The vinyl plastic body is normally pigmented to be opaque and the polyethylene terephthalate is transparent so that the metallized film is visible therethrough. The encapsulating transparent plastic is then applied to the composite strip as a hot melt in an extruder, and the encapsulated composite strip is laterally shaped while hot and then cooled to permanently retain the desired nonplanar cross section.

The metallized film is very thin and has little strength of its own having a maximum thickness of about 25 microns, and a usual thickness of less than 3 microns. The pigmented plastic layer provides a rigidifying support and is preferably pigmented polyvinyl chloride. The transparent plastic which is applied as a hot melt in the extruder is also preferably polyvinyl chloride.

In preferred practice, the metallized composite strip is fed through a conventional extruder having, for example, a cross-head extrusion die through which the composite strip is supported and guided by a nose piece located as close to the exit aperture of the extruder as is convenient to minimize the thermal impact upon the composite strip which is encapsulated. Molten thermoplastic material is fed into the extruder, preferably as near to the exit end of the extruder as possible, again to minimize thermal impact. The extruded product exits hot from the extruder in a generally flat condition (or a portion of it is flat) and is drawn through a forming zone where it is laterally bent to provide a nonplanar cross section. This forming zone is desirably contained in a cooling zone so that shaping is coupled with some hardening of the encapsulated composite strip into the desired nonplanar cross section. The product is then further cooled so that the desired cross section is permanently retained.

The resulting encapsulated composite metallized strip is longitudinally bendable without disfiguring the metallized film, and this adapts the product for decorative utilities where longitudinal bending is necessary.

The present invention will be better understood by referring to the drawings wherein:

FIG. 1 is a fragmentary cross-sectional view of an illustrative composite metallized strip;

FIG. 2 is a diagrammatic view of a drip rail of this invention mounted above a door of a truck;

FIG. 3 is a cross-sectional view of a composite drip rail taken substantially along line 3—3 of FIG. 2;

FIG. 4 illustrates in solid line a cross-sectional view of a T-shaped locking strip in accordance with principles of the present invention, and depicts in phantom or broken line the shape of the T-shaped locking strip after it has been longitudinally bent;

FIG. 5 is a cross-sectional view of the T-shaped locking strip after it has been longitudinally bent and mounted between a drip rail and a window;

FIG. 6 is a diagrammatic view of the T-shaped locking strip mounted about the quarter window of a vehicle; and FIG. 7 is a diagrammatic view of one method of forming a laterally bent and longitudinally bendable extrusion product in accordance with principles of the present invention.

Referring to FIG. 1 of the drawings, there is shown an elongated composite metallized strip, core or ribbon 10 having a highly-reflective metallized layer or film 12 sandwiched between an elongated light-transmissive fluid-impervious substrate 14 and an elongated rigidifying support layer 16. The composite metallized strip can be used in various extrusion products, such as a decorative trim strip, or a composite drip rail 18 as shown in FIG. 3 or a T-shaped locking strip 20 as shown in FIG. 5.

The metallized layer 12 includes a multitude of metallized flakes or particles, such as aluminum particles, vacuum deposited or otherwise fixedly secured to the substrate 14. The metallized layer has a tendency, when unsupported, to wrinkle, buckle or otherwise deform under extrusion conditions. Generally, the metallized layer is of a uniform thickness and has first and second generally planar surfaces 22 and 24, respectively. The maximum thickness of the metallized layer is about 25 microns, with a usual thickness of less than 3 microns.

The substrate 14 is of clear, transparent or translucent plastic material to enable the metallized layer to be seen through the substrate and has sufficient impact resistance to substantially protect the metallized layer during normal automobile operating conditions. The substrate, however, should be sufficiently thin to accommodate longitudinal bending and flexing. Preferably, the substrate is of polyethylene terephthalate, having a thickness, such as about 0.120 inch, although other thickness may be used when desired. The substrate has an outer surface 26 and an inner surface 28, which in the illustrative embodiment are in generally coplanar relationship to each other. The inner surface 28 is coextensive and fixedly secured, such as by thermoplastic bonding or otherwise, to the first planar surface 22 of the metallized layer 12.

The rigidifying support layer 16 overlies the second planar surface 24 of the metallized layer 12 and is generally an opaque non-reflective plastic. Preferably, the support layer is of polyvinyl chloride and is pigmented, such as with a black pigment, to prevent the metallized layer from being seen through the rigidifying support layer. The rigidifying support layer has an inner backing surface 30 and an outer exterior surface 32, with the inner backing surface coextensively confronting and thermoplasticly bonded, or otherwise secured, to the second planar surface 24 of the metallized layer. In the illustrative embodiment, the outer exterior surface 32 is generally in coplanar parallel relationship to the inner backing surface 30 and is typically used to intimately contact thermoplastic material during extrusion.

An important feature of this invention is that the rigidifying support layer is of a sufficient depth and hardness for withstanding extrusion pressures and temperatures without deteriorizing, sagging and stretching so as to prevent buckling, breaking-up and bunching of the metallized layer in the extruder. Another important aspect of this invention is that the rigidifying support layer is sufficiently thin to accommodate longitudinal bending and flexing, yet is sufficiently rigid and thick to firmly support the metallized layer during longitudinal bending without delamination, wrinkling and discoloring of the metallized layer. The depth or thickness of the rigidifying support layer is generally defined as the minimum distance between the inner backing surface 30 and the outer exterior surface 32. For polyvinyl chloride, the rigidifying support layer has a depth or thickness of at least 0.010 inch, which is the minimum thickness for (a) withstanding extrusion pressures and temperatures without substantial deformation of the rigidifying support layer so as to prevent the metallized layer from bunching up in the extruder, and (b) for preventing delamination and wrinkling of the metallized layer during longitudinal bending and flexing of the composite metallized strip. The depth or thickness of the polyvinyl chloride should not exceed 0.050 inch, which is the maximum thickness to accommodate longitudinal bending and flexing of the rigidifying support layer. The preferred thickness range of the polyvinyl chloride is from about 0.012 inch, which is 0.002 inch over the minimum thickness so as to provide a safety factor during variations of extrusion pressures and temperatures, to about 0.030 inch, which is 0.020 inch below the maximum thickness so as to provide the desired amount of flexibility. For some types of extrusion products, it is desirable to keep the thickness of the polyvinyl chloride rigidifying support layer as small as possible within the above preferred range, that is preferably about 0.012 inch, to maximize the flexibility of the composite metallized strip. Preferably, the hardness of the polyvinyl chloride support layer is about 49±5 Shore hardness (D scale using the 15 second delay method).

The composite metallized strip 10 may be used in producing a laterally bent and longitudinally bendable encapsulated metallized extrusion product, such as a J-shaped composite drip rail 18 as shown in FIG. 3. The J-shaped drip rail has an elongated main body or sheath 34 of light-transmissive fluid-impervious thermoplastic, such as transparent polyvinyl chloride, with laterally opposed exterior surfaces 35 and 37. The main body is generally J-shaped with an upright portion 36 and a hooked-portion 38. The back surface 40 of the upright portion 36 is coated with a pressure-sensitive adhesive 42 which is normally covered with a peelable paper backing prior to use. When it is desired to secure the drip rail to the exterior surface 44 of a truck as shown, the peelable paper backing is removed and discarded. The upwardly-facing surface 46 of the hooked portion 38 generally defines a channel, conduit or gutter for retaining and channeling water. The main body 34 thermoplastically encapsulates the composite metallized strip 10 with the outer exterior surface 32 of the rigidifying support layer 16 facing exterior surface 35 and the light-transmissive fluid-impervious substrate 14 facing exterior surface 37 so that the highly-reflective metallized layer 12 may be viewed from exterior surface 37. As shown in FIG. 2, the drip rail can be longitudinally bent and fixedly secured above the door 50 of a truck 52 or the like to catch falling rain water or melting snow and channel the water to the roadway.

The elongated composite metal strip 10 is also useful in forming a laterally bent and longitudinally bendable extrusion product such as a composite T-shaped locking strip 20 for mounting around the quarter window 54 of an automobile 56; such as the back quarter window of a Chevrolet Vega. When installed, the T-shaped locking strip serves as a decorative trim as well as a weather strip. As shown in the solid line of FIG. 4, the T-shaped locking strip has a fluid-impervious main-thermoplastic body or sheath 58 of transparent or translucent plastic, such as clear non-pigmented polyvinyl chloride. The thermoplastic main body includes an elongated base portion 60 and a cross-portion 62. The composite metallized strip 10 is encapsulated in the base portion with the substrate 14 facing outwardly, so that the highly-reflective metallized layer 12 can be viewed from the front or top surface 63 of the T-shaped locking strip. The T-shaped locking strip is longitudinally bendable as is shown in phantom or broken line in FIG. 4, so that it can be custom shaped and mounted in the field. In the illustrative embodiment, the cross-portion 62 overlies the window 54, and one end 61 of the base portion 60 overlies the unattached hook end of the drip rail 18'. The other end 63 of the base portion is wedged between the window and the drip rail.

FIG. 7 shows a diagrammatic view of one method of forming a laterally bent and longitudinally bendable encapsulated metallized extrusion product 64. In FIG. 7, the composite metallized strip 10 is fed into an extruder 66, such as a cross-head extrusion die. In the illustrative embodiment, the composite metallized strip is supported and guided by a nose piece positioned in the rearward section of the extruder. Simultaneously, molten thermoplastic material 68, such as clear non-pigmented polyvinyl chloride, is fed into the extruder. The molten thermoplastic intimately contacts and encapsulates the composite metallized strip near the exit of the cross-head extrusion die so as to minimize thermal impact. The extrusion die has an internal contour conforming to a preselected cross-sectional shape of the extruded product 70. For the J-shaped composite drip rail 18 the internal contour of the extrusion die is shaped so that the extruded product exits hot from the extruder in a generally flat condition. For the composite T-shaped locking strip 20, the extruded product exits hot from the extruder in a T-shaped configuration substantially as shown in solid line in FIG. 4. The hot pliable extruded product or encapsulate 70 upon exiting the extruder 66 is drawn through a forming zone 72 generally defined by water-cooled plates or blocks 74 having a water-inlet 76 and a water-outlet 78, where the extruded product is laterally bent and cooled. The internal contour or passageway of the water-cooled plates or blocks generally conforms to the ultimate non-planar cross-sectional shape of the laterally bent extruded product 80. For example, the composite drip rail is laterally bent to a J-shape in the forming zone. The T-shaped locking strip, however, is laterally bent in the forming zone so as to take on the configuration shown in FIG. 5. The laterally bent extruded product exits the water-cooled plates or blocks in a warm condition and is drawn through a cooling zone 82, such as a water trough, where the product is cooled and hardened so that the desired cross section is permanently retained. In the preferred embodiment the cooling zone is part of the forming zone. The resultant laterally bent and hardened extrusion product 64 is longitudinally bendable without disfiguration or delamination of the composite metallized strip 10.

Although embodiments of the invention have been shown and described, it is to be understood that various modifications and substitutions may be made by those skilled in the art without departing from the novel spirit and scope of the invention.

We claim:
1. A method of producing a laterally bent and longitudinally bendable encapsulated metallized extrusion, comprising the steps of:
   extruding a composite extrusion product, including feeding a metallized composite strip to an extruder, said metallized composite strip being constituted by a rigidifying plastic support layer having a thickness of from 0.010 inch to 0.050 inch bonded to a layer of transparent plastic having a metallic film coating with a thickness less than 25 microns on the face thereof bonded to said support layer, feeding molten transparent plastic to said extruder, encapsulating the metallized composite strip within said molten transparent plastic, and withdrawing the encapsulated metallized composite strip from the extruder; drawing the composite extrusion product through a forming zone; laterally bending the composite extrusion product in the forming zone so as to provide a laterally bent and longitudinally bendable encapsulated metallized extrusion having a nonplanar cross section; and cooling said composite extrusion product in the forming zone to rigidify said laterally bent product and cause said non-planar cross section to be permanently retained.

2. A method as in claim 1 wherein the step of extruding includes extruding the composite extrusion product in a generally flat condition.

3. A method as in claim 1 wherein the step of extruding includes extruding the composite extrusion product in a generally T-shaped configuration.

4. A method as in claim 1 wherein the step of laterally bending includes forming a J-shaped drip rail.

5. A method as in claim 1 wherein the step of laterally bending includes forming a T-shaped locking strip.

6. A method of producing a laterally bent and longitudinally bendable encapsulated metallized extrusion comprising, feeding a metallized composite strip to an extruder, said metallized composite strip being constituted by a rigidifying plastic support layer having a thickness of from 0.010 inch to 0.050 inch bonded to a layer of transparent plastic having a metallic film coating with a thickness less than 25 microns on the face thereof bonded to said support layer, feeding molten transparent plastic to said extruder so that the product withdrawn from the extruder is a hot encapsulate of said metallized composite strip within a sheath of hot transparent plastic, laterally bending said hot encapsulate to provide a nonplanar cross section and then cooling said hot encapsulate to rigidify said encapsulate and cause said nonplanar cross section to be permanently retained.

7. A method as recited in claim 6 in which said lateral bending is accompanied by cooling.

8. A method as recited in claim 6 in which said plastic support layer is pigmented polyvinyl chloride, and said molten transparent plastic is also polyvinyl chloride.

* * * * *